3,232,363
ELECTRICALLY OPERATED HIGH FREQUENCY IMPACT AND ROTARY DRILL
Monte N. Moore, 2602 Leith St., Flint, Mich.
Filed Oct. 4, 1961, Ser. No. 142,798
12 Claims. (Cl. 175—105)

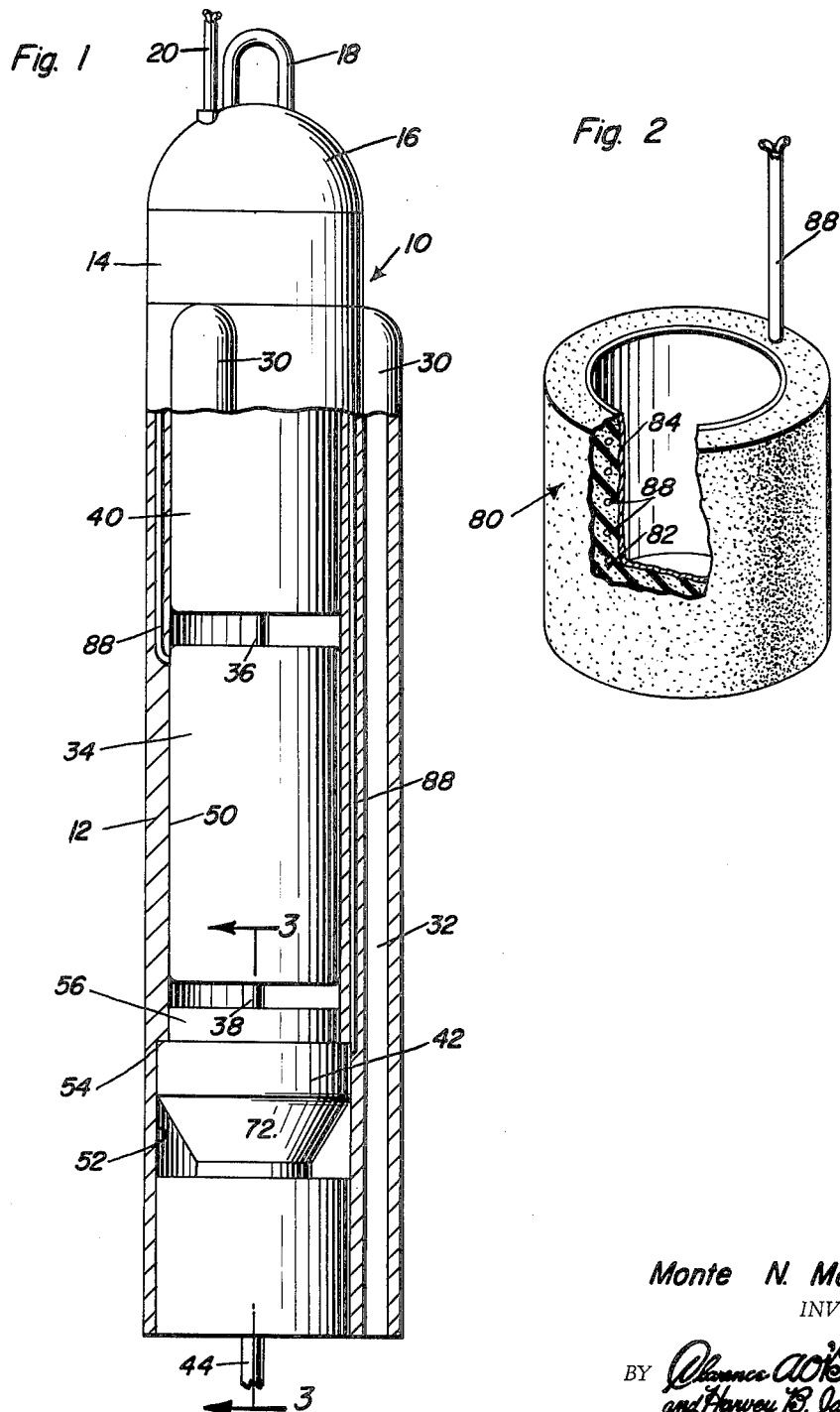

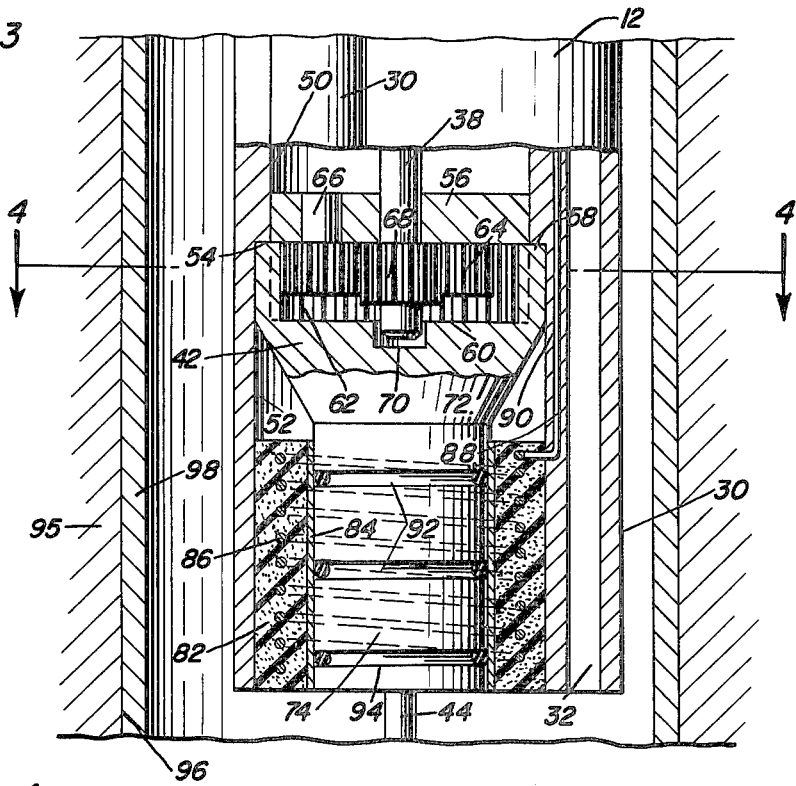
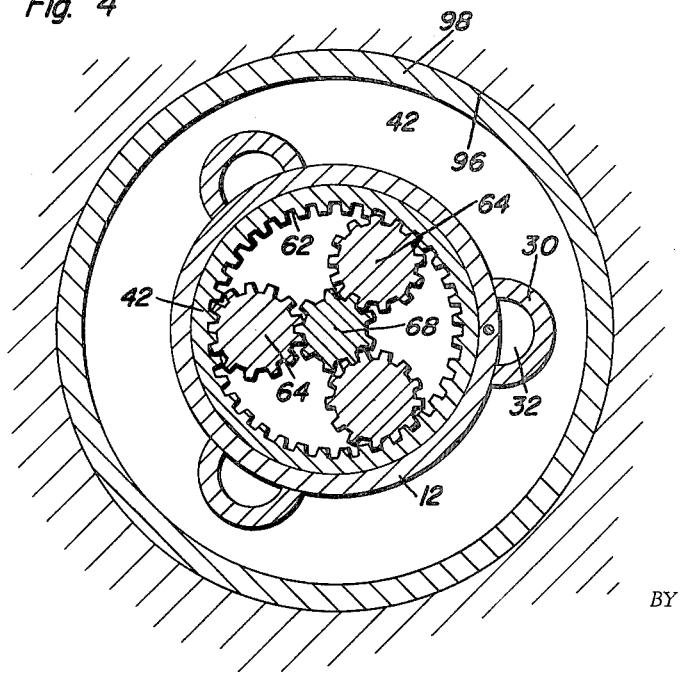
Monte N. Moore
INVENTOR.

This invention comprises a novel and useful electrically operated high frequency impact and rotary drill and more particularly pertains to an apparatus to effect in an improved manner drilling of relatively deep holes or bores and through various types of formations such as those required in the drilling of oil wells, geological drilling and the like.

This invention pertains to subject matter which is similar to and constitutes an improvement upon that disclosed in my prior copending application Serial No. 23,266, filed April 19, 1960 now U.S. Patent No. 3,173,501 for Unitary High Frequency Impact and Rotary Drilling Apparatus.

The primary object of this invention is to provide an apparatus and a method of drilling wherein the advantages of the rotary drilling method and the impact drilling method are efficaciously combined into a single improved mechanism and method.

A further object of the invention is to provide an apparatus in accordance with the preceding object whereby the source of power for imparting both reciprocatory and rotary motion to the drill will be positioned closely adjacent to the drill bit and will be raised and lowered together therewith regardless of the depth at which the drill bit is employed, and regardless of whether the drilling is initiated upon land or under water.

A further important object of the invention is to provide a drilling apparatus and a method whereby an electric motor may be coupled to mechanism for driving a drill bit and may be suspended at the lower end of a pipe, tubing string or by a wire line or other means and whereby the motor may be located very closely adjacent to the drill bit for reducing any torque lag therebetween such as that commonly encountered in the use of a rotary drill stem powered by the usual rotary table at the surface of the ground and which rotary table is connected to the drill bit by a drill string of varying length.

A further important object of the invention is to provide an apparatus and a drilling method associated therewith which may be equally efficaciously employed for operating a drill bit to sink a bore into the ground or to operate a core drill for taking core samples from the bore hole.

A further and more specific object of the invention is to provide an apparatus and a method in accordance with the foregoing objects wherein electrically operated means are provided for effecting a high frequency vertical reciprocation of the drill bit which in conjunction with the rotation of the drill bit will effect a much more effective penetration of the soil.

Still another object of the invention is to provide an apparatus and method in accordance with the preceding objects wherein a single unitary assembly shall contain therein as components thereof a drill bit, an electric motor for imparting rotation to the drill bit, a high frequency generator driven by an electric motor together with means operatively connecting the high frequency generator to the drill bit for effecting a very rapid high frequency vertical reciprocation of the drill bit during its rotation.

An additional important object of the invention is to provide both an apparatus and a method according to the above set forth objects whereby a rotary drill may be subjected to high frequency electrical vibrations whereby to effect a vibratory impact drilling and whereby the frequency of the electrical vibrations may be controllably varied during operation of the drill in order to obtain the most effective drilling performance.

A still further object is to provide an electrically vibrated drill wherein the solenoid coil for vibrating the drill is sealed in the drill housing by embodiment in a body of a resilient, elastic dielectric which closes and hermetically seals the coil in the housing and also comprises a shock absorbing mounting for the drill and its driving and supporting means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view partly in elevation and partly in vertical section showing a preferred form of unitary apparatus in accordance with the present invention;

FIGURE 2 is a perspective view, partly broken away, of a part of the electrical vibratory impact producing mechanism of the invention;

FIGURE 3 is a detail view taken in vertical section upon an enlarged scale substantially upon the plane indicated by the section line 3—3 of FIGURE 1, parts being shown in elevation and showing a preferred form of apparatus by which combined rotary and vertical reciprocatory movement is imparted to the drill unit of the apparatus; and FIGURE 4 is a detail view in horizontal section taken substantially upon the plane indicated by the section line 4—4 of FIGURE 3 and showing the reduction gear assembly for imparting rotary movement to the drill of the apparatus.

Although not limited thereto, this invention is especially well adapted for submarine types of drilling in that the entire drilling unit is fully enclosed and sealed in such a manner as to be completely impervious to the effects of water or other liquids and second, the operation of the unit is independent of the limitations currently imposed by the common practice heretofore of mounting the drilling unit upon the lower end of a relatively rigid, long and heavy drilling string whose upper end is connected to a source of power at the surface. The unit can therefore be handled by a wire line or cable thereby greatly reducing the weight, completely obviating the necessity for the usual rigid drilling string and its required continuous circulation from the surface of the ground to the bottom of the well bore of a drilling fluid.

The apparatus illustrated in the accompanying drawings as constituting an exemplary embodiment in accordance with the principles of this invention is designated generally by the numeral 10. It includes an elongated cylindrical casing or body 12 of suitable material, size and construction having a connecting sub or joint 14 screw threadedly engaged upon its upper end and to the top of which sub is similarly attached a conoidal or spherical cap or head 16. The latter is provided with a bail 18 for connection to a wire line or other means for raising or lowering the device, while electric power is supplied to the mechanism in the interior of the unit by means of suitable conventional electric cables 20 which extend from the unit to the surface.

The entire unit 10 is preferably of a uniform diameter throughout its length and is circular in cross section except for the presence of hollow ribs 30, see FIGURE 4 in particular, extending longitudinally thereof and providing longitudinally extending passages 32 therein. The interior of the body member 12 is generally cylindrical and hollow and houses therein various components of the drilling unit. Thus, there is provided an electric motor 34 of any conventional design and which has an armature shaft therein extending upwardly from the motor as at 36 and downwardly therefrom as at 38. The upwardly extending portion of the armature shaft is suitably coupled or connected to the armature shaft, not shown, of a high frequency electric generator indicated generally by the numeral 40. The lower end of the shaft 38 as will be more readily apparent from FIGURE 3 is operatively connected to and constitutes a source of power for rotatably supporting thereon and driving the rotor 42 which at its lower end has a driving shaft 44 fixedly attached and projecting downwardly from the bottom of the unit and which in turn constitutes the power input shaft of any suitable type of drill. The present invention is equally adaptable to core drills as well as to various conventional types of drill bits. Inasmuch as the principles of the invention claimed herein do not depend upon and do not require any particular type of drill, further illustration and description thereof is deemed to be unnecessary. It is sufficient to note that the drill may conveniently and advantageously be of the construction disclosed and claimed in my prior copending application Serial No. 23,266, filed April 19, 1960 entitled Unitary High Frequency Impact and Rotary Drilling Apparatus.

Both the electric motor 34 and the high frequency generator 40 are removably but fixedly secured within the cylindrical casing 12 of the unit 10. However, the rotor 42 is revolvably mounted therein. In addition, the rotor is mounted for limited vertical reciprocatory movement or vibration and is cushioned in the casing in a manner to be subsequently set forth.

Referring now to FIGURE 3 it will be seen that the cylindrical bore 50 which extends the full length of the interior of the casing 12 is diametrically enlarged at its lower end to provide a bore 52, there being thus provided an annular shoulder 54 between the junction of these bores. The rotor 42 has a diametrically reduced cylindrical upper portion 56 which is fixedly secured in the lower end of the bore 50, while the junction of the reduced upper portion 56 and the main body of the rotor 42 thus provides an annular shoulder 58 which is complementary to the shoulder 54 of the casing or housing 12. The rotor 42 is provided with a chamber 60 in its upper end which constitutes a reduction gear chamber. This chamber has a peripheral wall which is internally geared as at 62, see FIGURE 4, this internal gear being engaged by a plurality of idler gears 64 each of which is carried by a stub axle 66 suitably journaled in the portion 56. Disposed centrally of the idler gear 64 and continuously meshing therewith is the driving gear 68 which is secured to the lower end of the motor armature shaft 38.

It is important to note at this point that the chamber 60 in which is disposed the internal gear 62 is of considerably greater axial extent than the thickness of the idler gears or of the drive gear 68, as clearly shown in FIGURE 3. It may therefore be seen that the internal gear 62 may reciprocate axially with regard to the idler gears 64 without becoming disengaged therefrom. To facilitate this movement there is proivded a recess 70 disposed centrally of the chamber 60 below the bottom end of the shaft 38.

It will be further noted from FIGURE 3 that the upper portion of the rotor 42 has a downwardly convergent conical surface 72 whose lower end merges into a diametrically reduced cylindrical body 74.

This last mentioned body portion is of a material having a high property for magnetic attraction so that it may constitute the vibrating core of an electromagnet or solenoid as set forth hereinafter. There is provided a cylindrical body indicated generally by the numeral 80 in FIGURE 2 of a dielectric material which is received between the open lower end of the enlarged bore 52 and the rotor lower portion 74. The member 80 is of any suitable dielectric material which will stand the pressures, temperatures, physical and chemical conditions to which it may be subjected in use. The body 80 consists of a cylinder 82 of cushioning dielectric material which is suitably securely bonded to or detachably secured in the lower end of the enlarged bore 52, there being thus provided a bronze bushing or liner 84 disposed through the central opening of this body which bushing snugly and slidably receives and guides the vertically reciprocating and vibrating rotor lower portion 74.

A suitable electromagnetic coil 86 is embedded in the material 82 of the bushing 80 and is provided with or connected with electric current as by the cable 88. The latter extends through the wall of the casing or housing 12 by means of a passage 90 bored or otherwise provided therein and as suggested in FIGURE 1 communicates with the high frequency generator 40 for receiving its current supply therefrom.

Any suitable means are provided for establishing a fluid-tight sealed engagement between the vertically reciprocating lower extremity 74 of the rotor 42 and the bronze bushing 84 of the solenoid unit 80. As shown in FIGURE 3, suitable O-rings 92 received in channels 94 may be provided upon the diametrically reduced cylindrical surface 74. Alternatively, the O-rings and channels may be provided in the adjacent cylindrical surface of the bronze bushing 84, or in both of these members if desired. Inasmuch as various suitable types of sealing means may be provided to effect a fluid-tight engagement between the solenoid and its vibrating armature constituted by the member 74, it is deemed that further discussion of such construction is unnecessary for the purposes of this invention.

While various suitable materials may be utilized for the dielectric material 82 of the solenoid unit 80, the purposes of this invention are especially effectively served by employing a silicone rubber insulation having the property of resisting without damage temperatures up to 520° F. This material is preferably poured about the solenoid windings 86, and as previously mentioned this material may be bonded to or removably secured to the diametrically enlarged bore 52 at the lower end of the casing or housing 12. Preferably, as shown in FIGURE 3, the housing 12, the material 82 of the solenoid unit 80 and the bronze bushing 84 likewise bonded to the dielectric material 82 terminate in a common plane at their lower ends.

The high frequency generator 40, previously mentioned, may be of various desired types. It is powered directly from the electric motor 34 and its output is directly delivered to the solenoid windings 86. The output of this generator thus is utilized to effect alternating energization of the solenoid which in turn will effect vertical reciprocation or vibration of the rotor 42 by utilizing the lower portion 74 thereof as a solenoid armature.

It will thus be apparent that the motor 34 serves both to impart rotation through the reduction gearing assembly previously mentioned to the rotor 42 and thus to the drill elements carried thereby. At the same time, the motor also serves to operate the high frequency generator 40 which in turn imparts vertical vibration or reciprocation to the rotor and thus to the drill units carried thereby. Thus, the drilling units are subjected to both rotary action and also to impact action of a high frequency character, thus very materially assisting the drill units to penetrate and drill the desired bore.

FIGURE 3 indicates generally the manner in which this invention is employed. A portion of a subterranean formation is suggested by the numeral 95 into which has been extended the bore 96 by the drilling units carried by and operated by the rotor 42. This bore may be cased as by a well casing 98 in accordance with conventional practice.

The high frequency generator is preferably of a type having a capacity for producing vibrations varying in frequency and amplitude.

The high frequency generator 40 may be of various conventional types capable of producing various frequencies of electric current. Since the generator output is connected to the solenoid coil 86, the latter may be in turn correspondingly variably energized thereby obtaining a high frequency vibration of the drill which will correspond to the selected frequency of the generator. The latter may be regulated from the surface in any desired manner as by various conventional electro-mechanical or electronic control means for adjusting the frequency of its output. This arrangement effects a precisely regulated and a wide range of frequency vibrations of the drill bit, enabling the rate of vibration to be varied to determine the most effective frequency or amplitude of vibrations for drilling a particular formation or portion thereof.

Various shock absorbing elements such as resilient O-rings, cushions and the like may be interposed between the vibrating dielectric body 82 and adjacent shoulders or surfaces in the confining and housing member therefor.

The drill unit 10 may be provided with its own drilling fluid circulating system if desired, and the conduits 32 will conveniently serve this purpose. This obviates the necessity for maintaining circulation of drilling fluid from the surface to the bottom of the well bore, a distinct and important advantage for underwater drilling operations.

It should be here noted that the electric cable assembly 20 previously mentioned will include not only conductors for supplying power to the motor 34, but also electric conductors by which the frequency and the output of the high frequency generator 40 may be varied from the surface. Thus, the frequency of vibration of the drilling unit may be varied from time to time, experimentally or otherwise, in order to obtain the most effective frequency of impact for a given speed of rotation of the drill units in the formation being drilled.

In order to prevent undesirable inflow of water, during underwater operations, and/or well fluids into the housing of the drill unit a pressure is maintained therein which is equal to or in excess of the pressure of the surrounding fluid medium. This may conveniently be effected by operation from the surface of pumps, at the drill unit, or any intermediate location.

The foregoing is considered as illustrative only of the principles of the invention. Further, since numerous modifications and changes will readily occur to those skilled in the art, it is not desired to limit the invention to the exact constructon and operation shown and described, and accordingly all suitable modifications and equivalents may be resorted to, falling within the scope of the invention as claimed.

What is claimed as new is as follows:

1. A well drilling apparatus for deep wells comprising a drill unit of the submersible type comprising a vertically elongated casing adapted for movement into and through a well bore, an electric motor in said casing adapted to be powered from the surface of the ground, a drill supported by said casing and adapted for both rotary and vertical reciprocatory movement, a drill drive means connecting said motor to said drill for rotating the latter, a solenoid adapted for high frequency operation and surrounding a portion of said drill drive means, said portion including magnetizable material responsive to energization of said solenoid for effecting vertical reciprocatory vibration of said drive means and said drill means, means controllable from the surface of the ground for effecting with an adjustable frequency a high frequency energization of said solenoid and thereby producing an adjustable high frequency vibration of said drill independent of its rotation, said drive means includes a rotor mounted in said casing for independent axial sliding and rotary movement, said drill being engaged with said rotor for rotary and axial movement therewith, a gearing assembly including driving and driven gears fixedly secured respectively to said motor and rotor, said gearing assembly providing for relative axial movement between said driving gears and said driven gear during vertical reciprocation of said rotor while maintaining a continuous driving connection of said gearing assembly.

2. The combination of claim 1 wherein said casing and rotor have cooperating stop means engageable and limiting the range of axial vibratory movement of said rotor in said casing in response to the energization of said solenoid coil.

3. The combination of claim 1 wherein said coil energizing means includes an adjustable frequency high frequency electrical generator housed within said casing and connected to and driven by said electric motor.

4. The combination of claim 3 wherein said electric motor is disposed between and is drivingly connected to each of said high frequency generator and said drill drive means.

5. The combination of claim 1 wherein said rotor has a gear chamber therein, said gearing assembly having said driven gear fixed to the wall of said gear chamber, said driving gear extending into said gear chamber and idler gears in said chamber connecting said driving and driven gears by a continuous but axially displaceable engagement said gearing assembly including fixed means for supporting the idler gears.

6. The combination of claim 5 wherein said chamber includes bottom wall together with a peripheral wall, said driven gear comprising an internal ring gear constituting axially extending teeth on said peripheral wall, said idler gears being disposed on axles carried by said support means.

7. The combination of claim 6 wherein said electric motor has a drive shaft extending axially through said idler support means, said driving gear being fixed upon said drive shaft and disposed centrally of said chamber, said bottom wall having a recess aligned with said drive shaft and providing clearance for the latter upon vertical vibratory movement of said rotor.

8. The combination of claim 1 wherein said solenoid further comprising a resilient cushioning and shock resistant dielectric body with the coil of the solenoid being disposed within and fixedly secured to said casing.

9. The combination of claim 8 wherein said solenoid core is embedded in said cushioning dielectric body which is cylindrical.

10. The combination of claim 8 wherein said dielectric body has a non-magnetic bearing liner therein slidably journaling and guiding said rotor during its reciprocatory vibration.

11. The combination of claim 10 including fluid sealing means interposed between said rotor and said bearing liner.

12. The combination of claim 11 wherein said dielectric body is of silicone rubber having the property of withstanding without damage operating temperatures of at least 520° F.

References Cited by the Examiner
UNITED STATES PATENTS

| 1,523,629 | 1/1925 | Bullock | 175—106 X |
| 1,530,803 | 3/1925 | Anderson | 175—106 X |
| 1,567,197 | 12/1925 | Schmidt | 175—105 X |
| 1,966,446 | 7/1934 | Hayes | 175—56 X |
| 2,035,350 | 3/1936 | Stoll | 175—105 X |
| 2,313,401 | 3/1943 | Traylor et al. | 310—30 |
| 2,315,993 | 4/1943 | Weyandt et al. | 310—30 |
| 2,383,411 | 8/1945 | Obzarny | 310—30 |
| 2,655,343 | 10/1953 | Pestarini | 173—117 X |
| 2,830,791 | 4/1958 | Smith | 175—105 X |
| 2,950,088 | 8/1960 | Scott | 175—104 |
| 3,036,645 | 5/1962 | Rowley | 175—104 X |

FOREIGN PATENTS 2,443   1904   Great Britain.

CHARLES E. O'CONNELL, *Primary Examiner.*